United States Patent [19]

Zeilinger

[11] 4,212,369

[45] Jul. 15, 1980

[54] SOUND-ABSORBING COVERING, ESPECIALLY RADIATOR COVERING FOR MOTOR VEHICLES

[75] Inventor: Karl Zeilinger, Berglen, Fed. Rep. of Germany

[73] Assignee: Daimler-Benz Aktiengesellschaft, Fed. Rep. of Germany

[21] Appl. No.: 13,817

[22] Filed: Feb. 22, 1979

[30] Foreign Application Priority Data

Feb. 25, 1978 [DE] Fed. Rep. of Germany ....... 2808166

[51] Int. Cl.$^2$ ............................................. F04F 17/04
[52] U.S. Cl. .................................... 181/224; 181/258; 181/268
[58] Field of Search ............... 181/200, 204, 202, 205, 181/198, 256, 211, 247, 264, 268, 224, 281, 239, 225

[56] References Cited

U.S. PATENT DOCUMENTS

| | | | |
|---|---|---|---|
| 1,964,845 | 7/1934 | Dietze et al. | 181/224 |
| 3,857,453 | 12/1974 | Buttke et al. | 181/204 |
| 3,923,114 | 12/1975 | Suzuki | 181/204 |
| 4,121,683 | 10/1978 | Kohriyama | 181/211 |
| 4,122,908 | 10/1978 | Miers et al. | 181/211 |
| 4,169,501 | 10/1979 | Tukeuchi et al. | 181/224 |

*Primary Examiner*—L. T. Hix
*Assistant Examiner*—Benjamin R. Fuller
*Attorney, Agent, or Firm*—Craig & Antonelli

[57] ABSTRACT

A sound-absorbing covering, especially a radiator covering for motor vehicles whose air channel is adapted to be traversed by a gaseous medium in a direction opposite to the direction of travel of the sound; at least one section of a channel wall of the air channel is formed by an arcuate wall portion parabolically shaped in cross section which faces with its apex the in-flow side of the gaseous medium and which terminates in an arcuate apex portion projecting into the interior space of the channel; the arcuate apex portion shields a trough-shaped recess open in the direction toward the discharge side of the gaseous medium, in which is arranged a sound-absorbing insert within the area of the focal line.

27 Claims, 1 Drawing Figure

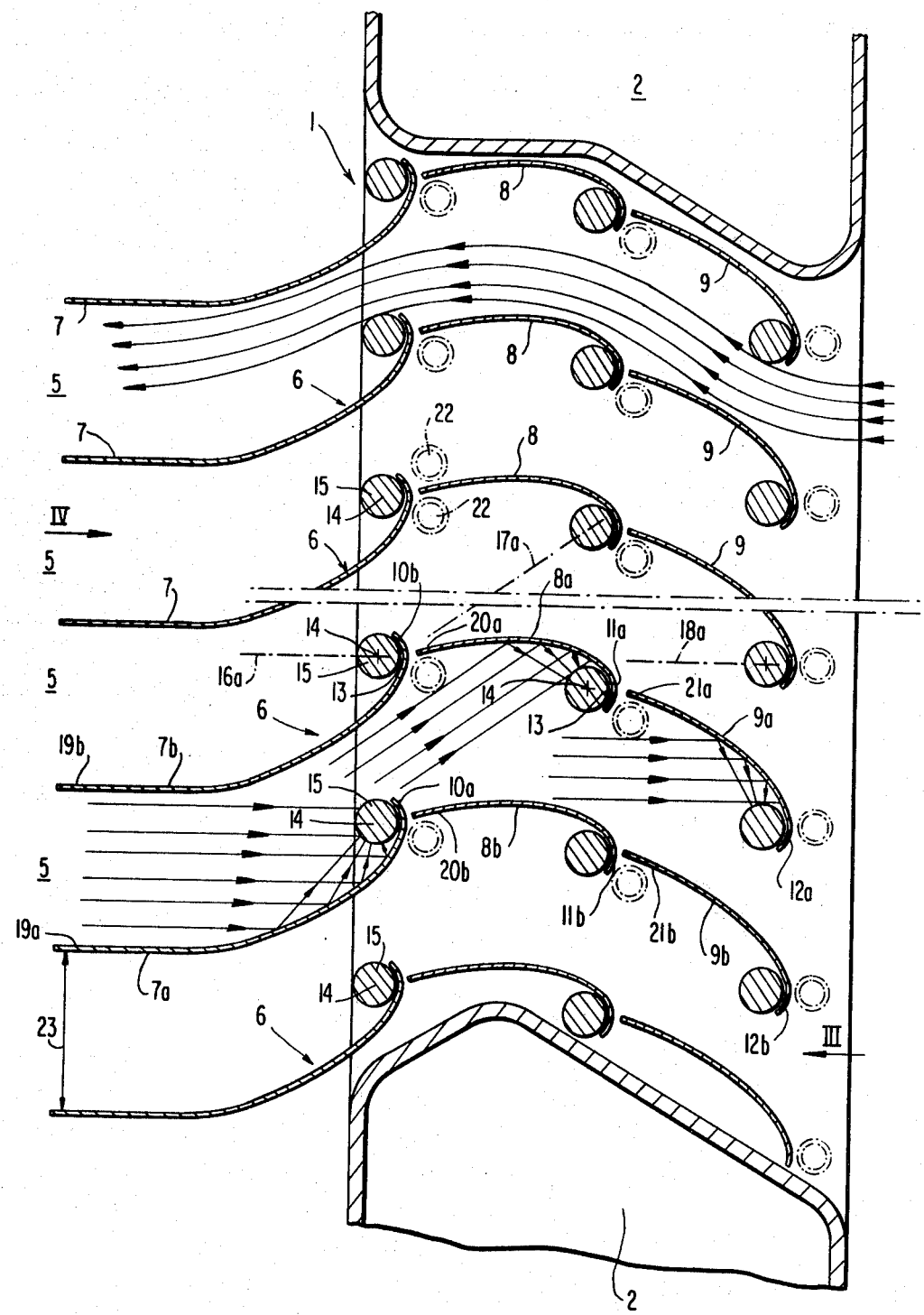

SOUND-ABSORBING COVERING, ESPECIALLY RADIATOR COVERING FOR MOTOR VEHICLES

The present invention relates to a sound-absorbing covering, especially to a radiator covering for motor vehicles, which is adapted to be traversed by a gaseous medium, especially by air, in a direction opposite to the direction of travel of the sound.

The present invention is concerned with the task to construct such a covering to the effect that, on the one hand, as free as possible a through-flow exists for the gaseous medium from one side and on the other, the sound is nonetheless absorbed as far-reachingly as possible from the other side.

A sound-absorbing covering of the aforementioned type is characterized according to the present invention by at least one air channel or duct, in which at least one section of a channel wall is formed by a curved or arcuate wall portion parabolically shaped in cross section, which faces with its apex the in-flow side and terminates in a curved or arcuate apex portion projecting into the channel interior space, whereby the arcuate apex portion shields a trough-shaped recess open toward the discharge or outflow side, and whereby a sound-absorbing insert is arranged in this trough-shaped recess within the area of the focal line.

By the solution according to the present invention a noise insulation for a noise source is achieved whereby air or some other especially gaseous medium must be able to reach the noise source without the possibility that a large flow resistance opposes the flow of the air or of the medium. This is feasible with the solution according to the present invention in that the air or medium is conducted with slight deflection through a covering having strong noise-absorbing properties. The strong noise-absorbing properties are thereby created in that a focusing of the sound waves in the sense of an introduction thereof into a strongly sound-absorbing material is undertaken, whereby as a result of the construction according to the present invention the sound-absorbing material can be arranged in such a manner that it lies practically outside of the cross section traversed by the air flow, properly speaking.

This is achievable in the solution according to the present invention with simple means, inter alia, in that, in relation to the respective channel longitudinal cross-section, the parabola axis of the respective parabolically shaped curved or arcuate wall portion extends through the respective interior channel space. Even though only a portion of the respective channel cross section is free for a far-reachingly unimpaired air through-flow, nonetheless the through-flow takes place in relation to this portion without larger deflections so that altogether favorable conditions result.

It is thereby particularly appropriate if for channel sections following one another in the direction of the sound, oppositely curved parabolically shaped arcuate wall portions are coordinated to oppositely disposed wall sides. In that connection, each of the channel sections may be formed by one or several parabolically shaped arcuate wall portions, especially with curvature configurations of the channel which are essentially oppositely directed over channel sections following one another, i.e., especially with adjacent channel sections having oppositely directed radii of curvature. Channel sections which follow one another may preferably also be mutually offset transversely to the flow direction in such a manner that no rectilinear free through-flow cross sections exist between inlet and outlet.

It is additionally appropriate as a further feature of the present invention to incorporate a radiator into the sound-absorbing covering. A particularly simple construction of the radiator results if cooling medium lines extending transversely to the flow direction are arranged in the transitional area between the arcuate apex portions of a parabolically shaped arcuate wall portion and an adjoining wall portion coordinated to the next-following channel section since with this arrangement the cooling medium lines are located essentially outside of the free air cross section, properly speaking, and impair only little the through-flow. Preferably, the cooling medium lines are thereby located ahead, i.e., upstream of the respective arcuate apex portion in relation to the through-flow direction.

Accordingly, it is an object of the present invention to provide a sound-absorbing covering, especially a sound-absorbing radiator covering for motor vehicles, which avoids by simple means the aforementioned shortcomings and drawbacks encountered in the prior art.

Another object of the present invention resides in a sound-absorbing covering, especially radiator covering for motor vehicles, which provides as free a through-flow as possible for a gaseous medium in one direction while absorbing as much as possible the sound travelling in the opposite direction without impairing the free through-flow of the gaseous medium.

A further object of the present invention resides in a sound-absorbing covering of the type described above, in which air or another gaseous medium is able to flow readily to a noise source while the sound waves emanating from the noise source which flow in the opposite direction are absorbed to the greatest possible extent.

Still a further object of the present invention resides in a sound-absorbing covering for radiators of motor vehicles which is simple in construction, highly effective in operation and particularly useful for the intended purposes.

Still another object of the present invention resides in a radiator covering for motor vehicles, in which an effective absorption of the noise emanating from the engine is attained without impairing the free through-flow of air into the engine compartment.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic view of a sound-absorbing covering according to the present invention, into which are integrated cooling medium lines.

Referring now to the single figure of the drawing, in the embodiment illustrated therein, the sound-absorbing covering according to the present invention which is generally designated by reference numeral 1 is located in an aperture which is delimited, for example, by way of body parts 2. Air flows toward the covering 1 in the direction of the arrow III so that this arrow III indicates the air in-flow direction. On the opposite side, i.e., downstream of the covering 1, as viewed in the air flow direction, a noise source is located which is not illustrated herein and which may be created, for example, by a vehicle engine. The direction of travel of the sound which is opposite to the arrow III, i.e., to the air in-flow direction, is symbolically indicated by the arrow IV.

A number of air channels 5 are formed and mutually delimited by the covering 1, whereby the channel walls generally designated by reference numeral 6 are constructed mutually identical in the illustrated embodiment and are each formed by several parabolically shaped arcuate or curved wall portions 7-9 which adjoin one another in the longitudinal direction of the channel.

The two channel walls 6 which each delimit a respective air channel 5 are, as already mentioned, constructed identically to each other in the illustrated embodiment according to the present invention and are designed and assembled in such a manner that a slightly curved, arcuately shaped channel configuration results in the through-flow direction. In relation to this general channel configuration and the indicated sound direction (arrow IV) which is opposite to the air in-flow direction (arrow III), the arcuate wall portions coordinated to the outside of the curvature are designated—for the fourth channel 5 from the top—by reference numerals 7a, 8a and 9a and the arcuate wall portions coordinated to the inside of the curvature are designated by reference numerals 7b, 8b, and 9b, whereby it should be taken into consideration that these designations refer only to one given air channel 5 and should be ignored if considering that in relation to the adjacent, adjoining channels, the arcuate wall portions coordinated to the inside of the curvature of the channel in question will then lie on the outside of the curvature.

Of the arcuate wall portions 7a to 9a and 7b to 9b, the arcuate wall portions 7a to 9a which are coordinated to the outside of the curvature are respectively thereby provided according to the present invention with arcuate apex portions 10a to 12a protruding into the channel 5, whereas the curved or respective arcuate apex portions 10b to 12b of the arcuate wall portions 7b to 9b coordinated to the inside of the curvature extend out of the channel 5 in question and protrude into the respective adjacent channel.

The arcuate apex portions 10a to 12a and 10b to 12b each thereby form, in relation to the channel into which they protrude, a trough-shaped recess 13. The recess 13 is open in the direction toward the air discharge side, in which corresponding to the parabolic shape of the arcuate wall portion lies the focal line 14 of the parabola and in which a sound-absorbing insert 15 is arranged, preferably concentrically to the focal line 14. A rod of strongly sound-absorbing material such as, for example, rock wool or the like may thereby serve as the sound-absorbing insert 15, whereby the rod axis preferably coincides with the focal line 14.

Corresponding to the described arrangement, the parabolically shaped arcuate wall portions 7a to 9a, whose respective arcuate apex portions 10a to 12a protrude into the same channel, are disposed one behind the other in the longitudinal direction of the channel. The portions 7a to 9a belong to different channel sides corresponding to their arrangement on the curvature inside or outside and have for their parabola axes 16a, 17a and 18a an extension, with which the parabola axes extend in respectively through the coordinated channel longitudinal cross section. In particular, the arrangement according to the present invention is such that the extension of the respective parabola axis corresponds approximately to the sound direction in the respective channel section.

In the solution described herein, and based on one duct, the duct arcs 7a, 8b, 9b forming one wall of this duct, and the duct arcs 7b, 8a, 9a forming the other wall of this duct are arranged in such a way that their legs 20b, 21b, and 20a, 21a, respectively, facing away from the apex and adjoining another wall arc, terminate approximately in the zone of the apex of apex arc 10a, 11b and 10b, 11a of the wall arc 7a, 8b and 7b, 8a, respectively, adjacent in the air flow direction (arrow III). In the dead zones respectively produced by the termination of a leg toward an apical arc, which dead zones extend at right angles to the air flow direction III and in parallel to the focal lines 14, coolant conduits 22 can be arranged, namely on one side as well as on both sides of the respective leg 20b, 21b and 20a, 21a, respectively. If such coolant conduits 22 are provided, then a compact combination of the noise-damping lining with a water or oil cooler is obtained.

In correspondence with the indicated sound direction IV, as seen from the source of the noise, the wall arcs 7a and 7b, associated with the walls of a duct, and being located adjacent to the source of the noise as based on the arrangement of the covering 1, are arranged preferably so that the noise enters approximately in parallel to the respective parabola axis 16a into the duct, wherrein the wall arc 7a is adapted in its shape to the width 23 of the duct in such a way that its apical arc 10a extends at least partially across the width of the duct. The free end of the apical arc 10a of the wall element 7a pertaining to one wall of the duct thus terminates practically at an imaginary extension of the asymptotically terminating zone of the leg 19b of the wall element 7b pertaining to the other duct wall and lying in opposition to the wall element 7a. Consequently, based on the inlet cross section of the duct, over the entire cross section of the duct, the sound entering exactly in the direction of arrow IV is focused, as indicated in the sketch, to the sound-absorbing insert 15 lying in the apical arc 10a, the reflection necessary for this purpose being attained by making the wall arcs forming the duct walls 6 preferably of a strongly sound-reflecting material.

Corresponding to the further channel configuration which results in that the arcuate wall portion 7b disposed in relation to a given channel opposite to the arcuate wall portion 7a has the same configuration of curvature, a second channel section adjoins the first channel section described above which, in the illustrated embodiment, extends obliquely upwardly and with respect to which the arcuate wall portion 8a forms the reflection shell, by means of which the sound entering this channel section is reflected at least to a considerable proportion in the direction toward the sound-absorbing insert 15 which is arranged in the corresponding arcuate apex portion 11a. By reason of the fact that the channel is curved altogether arcuately shaped and is drawn downwardly on the air inlet side with its arcuate wall portion 9a on the outside of the curvature which is coordinated to this channel section, so far that no direct rectilinear sound passage is possible between inlet and outlet, a considerable reduction of the noise level is achieved in conjunction with the intentional focusing of the sound waves onto the sound-absorbing inserts 15.

It is additionally preferably provided in the construction according to the present invention that, in relation to the channel inlet cross section having a width 23, the curvature is so large that an offset of the channel cross section with respect to the inlet cross section results by the curvature in the curved apex portion, which is preferably equal to or larger than the width of the inlet cross section.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A sound-absorbing covering operable to be traversed by a gaseous medium in a direction opposite to the direction of travel of the sound, characterized by at least one air channel means, in which at least one section of a channel wall is formed by an arcuate wall portion substantially parabolically shaped in cross section, the arcuate wall portion facing with its apex the in-flow side of the gaseous medium and terminating in an arcuate apex portion protruding into the interior space of the channel means, the arcuate apex portion shielding a trough-shaped recess substantially open in the direction of the discharge side of the gaseous medium, and a sound-absorbing insert means arranged in said recess at least approximately within the area of the focal line thereof.

2. A sound-absorbing covering according to claim 1, characterized in that the covering is a radiator covering for motor vehicles.

3. A sound-absorbing covering according to claim 1 or 2, characterized in that the gaseous medium is air.

4. A sound-absorbing covering according to claim 1, characterized in that in relation to the respective channel longitudinal section the parabola axis of the respective parabolically shaped arcuate wall portion extends through the respective interior space of the channel means.

5. A sound-absorbing covering according to claim 4, characterized in that in relation to the respective channel longitudinal section, the parabola axis of the respective parabolically shaped arcuate wall portion extends at an inclination to the in-flow direction of the gaseous medium toward this channel section.

6. A sound-absorbing covering according to claim 5, characterized in that the air channel means is curved in the through-flow direction and individual ones of the parabolically shaped arcuate wall portions are coordinated to oppositely disposed channel wall sections which are mutually offset in the through-flow direction.

7. A sound-absorbing covering according to claim 6, characterized in that of the arcuate wall portions forming the channel walls, the arcuate wall portions belonging to the curve outside in relation to the sound passage, extend with their arcuate apex portions into the interior space of the channel means.

8. A sound-absorbing covering according to claim 7, characterized in that the arcuate wall portions coordinated to the respective channel sections for both walls of a channel means are arranged with a substantially identical arrangement and construction thereof, mutually offset exclusively by substantially a channel width.

9. A sound-absorbing covering according to claim 8, characterized in that with a view toward an essentially uniformly curved through-flow between inlet and outlet side, several parabolically shaped arcuate wall portions which are disposed one behind the other in the through-flow direction are coordinated to the outer channel section in relation to the curvature.

10. A sound-absorbing covering according to claim 9, characterized in that in relation to one air channel means, whose walls are formed over the length thereof by respectively three parabolically shaped arcuate wall portions, approximately parallel parabola axes are provided for the arcuate wall portions which are provided at the ends.

11. A sound-absorbing covering according to claim 10, characterized in that substantially aligned parabola axes are provided.

12. A sound-absorbing covering according to claim 10, characterized in that a parabola axis is provided for the arcuate wall portion coordinated to the center channel section which is inclined in the sound direction substantially corresponding to the curvature configuration.

13. A sound-absorbing covering according to claim 12, characterized in that at least one cooling medium line extending substantially transversely to the through-flow direction is arranged in the transition area between the arcuate apex portion of a parabolically shaped arcuate wall portion and an adjoining wall portion coordinated to the next-following channel section.

14. A sound-absorbing covering according to claim 13, characterized in that the cooling medium line is disposed in front of the respective arcuate apex portion in relation to the through-flow direction of the gaseous medium.

15. A sound-absorbing covering according to claim 13 or 14, characterized in that at least one cooling medium line each is provided on both sides of the wall portion adjoining the arcuate apex portion and coordinated to the next-following channel section.

16. A sound-absorbing covering according to claim 1, characterized in that in relation to the respective channel longitudinal section, the parabola axis of the respective parabolically shaped arcuate wall portion extends at an inclination to the in-flow direction of the gaseous medium toward this channel section.

17. A sound-absorbing covering according to claim 1, characterized in that the air channel means is curved in the through-flow direction and individual ones of the parabolically shaped arcuate wall portions are coordinated to oppositely disposed channel wall sections which are mutually offset in the through-flow direction.

18. A sound-absorbing covering according to claim 17, characterized in that of the arcuate wall portions forming the channel walls, the arcuate wall portions belonging to the curve outside in relation to the sound passage, extend with their arcuate apex portions into the interior space of the channel means.

19. A sound-absorbing covering according to claim 1, 4, 16 or 17, characterized in that the arcuate wall portions coordinated to the respective channel sections for both walls of a channel means are arranged with a substantially identical arrangement and construction thereof, mutually offset exclusively by substantially a channel width.

20. A sound-absorbing covering according to claim 1, 4, 16 or 17, characterized in that with a view toward an essentially uniformly curved through-flow between inlet and outlet side, several parabolically shaped arcuate wall portions which are disposed one behind the other in the through-flow direction are coordinated to the outer channel section in relation to the curvature.

21. A sound-absorbing covering according to claim 1, 4, 16 or 17, characterized in that in relation to one air channel means, whose walls are formed over the length thereof by respectively three parabolically shaped arcuate wall portions, approximately parallel parabola axes are provided for the arcuate wall portions which are provided at the ends.

22. A sound-absorbing covering according to claim 21, characterized in that substantially aligned parabola axes are provided.

23. A sound-absorbing covering according to claim 21, characterized in that a parabola axis is provided for the arcuate wall portion coordinated to the center channel section which is inclined in the sound direction substantially corresponding to the curvature configuration.

24. A sound-absorbing covering according to claim 1, 4, 16 or 17, characterized in that at least one cooling medium line extending substantially transversely to the through-flow direction is arranged in the transition area between the arcuate apex portion of a parabolically shaped arcuate wall portion and an adjoining wall portion coordinated to the next-following channel section.

25. A sound-absorbing covering according to claim 24, characterized in that the cooling medium line is disposed in front of the respective arcuate apex portion in relation to the through-flow direction of the gaseous medium.

26. A sound-absorbing covering according to claim 24, characterized in that at least one cooling medium line each is provided on both sides of the wall portion adjoining the arcuate apex portion and coordinated to the next-following channel section.

27. A noise-damping lining such as may be used as a radiator lining for automotive vehicles, which lining can be traversed by a gaseous medium moving in a direction opposite to a sound generating source, comprising at least one air duct wherein, with an at least partially curved wall extension, the linear, free connection between end cross sections of said duct is covered, said duct being provided with at least one noise-absorbing insert, characterized in that at least one section of a wall of said duct is constituted by a wall arc having a parabola-shaped cross section, said wall arc facing with its apex toward the flow side of said gaseous medium, said wall arc terminating in an apical arc extending into the interior of said duct and screening a trough-shaped indentation open toward an exit side of said gaseous medium flow, said noise-absorbing insert being located in said indentation in the zone of the focal line of the parabola shape of said cross section.

* * * * *